(12) United States Patent
Borgognon et al.

(10) Patent No.: US 6,513,262 B1
(45) Date of Patent: Feb. 4, 2003

(54) DISPLACEMENT MEASURING DEVICE

(75) Inventors: Lucien Borgognon, Morges (CH); Marco Cardillo, Lausanne (CH); Roland Duteil, Genève (CH)

(73) Assignee: Brown & Sharpe TESA SA, Renens (CH)

( * ) Notice: Subject to any disclaimer, the term of this patent is extended or adjusted under 35 U.S.C. 154(b) by 0 days.

(21) Appl. No.: 09/659,804

(22) Filed: Sep. 11, 2000

(30) Foreign Application Priority Data

Oct. 22, 1999 (EP) .............................................. 99810966

(51) Int. Cl.$^7$ ................................................ G01B 3/22
(52) U.S. Cl. ............................. 33/832; 33/556; 33/559
(58) Field of Search ........................ 33/501.05, 501.08, 33/501.6, 832, 833, 556, 559, 542, 558, 561, 706, 708; 341/15; 324/658, 662, 686, 690

(56) References Cited

U.S. PATENT DOCUMENTS

| 1,497,372 | A | * | 6/1924 | Green ........................... 33/832 |
| 3,691,871 | A | * | 9/1972 | Gladow et al. ................ 33/832 |
| 3,721,010 | A | * | 3/1973 | Ristow ......................... 33/556 |
| 4,433,290 | A | | 2/1984 | Koch |
| 4,489,496 | A | * | 12/1984 | Mizuno et al. ................ 33/558 |
| 4,527,336 | A | * | 7/1985 | Mizuno et al. ................ 33/556 |
| 5,125,165 | A | * | 6/1992 | Gerhard ........................ 33/832 |
| 5,345,689 | A | * | 9/1994 | McMurtry et al. ............. 33/559 |
| 5,659,969 | A | * | 8/1997 | Butler et al. .................. 33/559 |
| 5,768,798 | A | * | 6/1998 | Takahashi et al. ............. 33/556 |
| 5,979,069 | A | * | 11/1999 | Hayashida et al. ............ 33/556 |

FOREIGN PATENT DOCUMENTS

| DE | 32 11 118 | 10/1983 |
| DE | 34 03 903 | 8/1985 |
| DE | 197 38 316 A | 4/1999 |

* cited by examiner

Primary Examiner—Diego Gutierrez
Assistant Examiner—Madeline Gonzalez
(74) Attorney, Agent, or Firm—Pearne & Gordon LLP

(57) ABSTRACT

A comparator measures and compares linear or angular dimensions. The comparator includes a metallic casing (2), and two bearings (23,24) such that a sensing probe (3), going through said casing (2) and worked directly into the casing (2), can be accommodated. Two sockets (8,9) of the comparator are firmly attached to the casing (2). A measuring system of the comparator includes a mobile portion (33) driven by the sensing probe and a fixed portion (27) firmly attached to the casing (2). A housing (10) of the comparator completely covers the outer sides (25) of the casing (2) and is held by the two sockets (8,9).

9 Claims, 2 Drawing Sheets

DISPLACEMENT MEASURING DEVICE

This application claims priority of European application EP99810966.4, filed on Oct. 22, 1999, and whose contents are hereby incorporated by way of reference.

FIELD OF THE INVENTION

The present invention concerns a measuring device, notably a comparator for measuring and comparing lengths or angles.

RELATED ART

An example of comparator is represented in the FIGS. 1 and 2. This comparator 1 comprises a casing 2, here of cylindrical shape, and a sensing probe 3 whose tip 30 is intended to come into contact with the object to be measured or checked. A mechanical, optoelectronic and/or electronic measuring system makes it possible to determine the longitudinal position of the measuring probe and to display it, for example on a hand dial or on a LCD 4. The comparator is generally provided with one or several sockets 8, 9 of normed dimensions enabling it to be attached to a machine or an external device. Comparators with electronic displays such as that represented are furthermore provided with a battery compartment 6, operating keys 5 as well as possibly a serial interface 7, for example an optoelectronic interface.

In the comparator represented in FIGS. 1 and 2, bearings 80, 90 are provided to allow an accurate sliding and guiding of the probe 3. In this example, the bearing 90 is worked directly in the upper socket 9 whereas the lower bearing 80 is mounted in the lower socket 8.

The comparator represented is fitted with a metallic housing whose outer sides have been surface-treated, notably for aesthetic reasons. Tightness is only partially ensured thanks to a solid casing 2 and a bottom 26 screwed or notched onto that casing and protecting the comparator's inner mechanism from sprayings of liquid. The device illustrated in FIG. 1 and 2 must therefore be kept clean to function properly and is thus poorly adapted to operating in an environment that is humid or subject to the spraying of dust, lubricant or cutting oil for example. In particular, it is important to ensure that the measuring system inside the comparator is free from all humidity.

Patent application DE3211118 describes another comparator similar to that represented in FIGS. 1 and 2. DE19738316 shows a comparator in which the sensing probe is guided by grooves worked inside the casing.

It is an aim of the present invention to propose a comparator that is improved over the comparators of the prior art. A purpose of the present invention is also to propose a comparator that is more economical, more accurate, more airtight and watertight, more resistant and/or comprising fewer components than the comparator illustrated in FIGS. 1 and 2.

BRIEF SUMMARY OF THE INVENTION

According to the invention, these aims are achieved by means of a comparator with the characteristics of the independent claims, variants of preferred embodiments being moreover described in the dependent claims.

According to the invention, these aims are achieved notably by moving the probe's travel bearings closer to one another. The invention thus proposes to use a distance I between the bearings that is less than the housing's diameter. This characteristic makes it possible to reduce the bending of the probe's rod and thus to increase accuracy.

According to another characteristic of the invention, these aims are also achieved by using bearings worked directly into the comparator's casing. This characteristic allows to reduce the number of components, and therefore the cost, and to diminish the sum of manufacture and assembly tolerances of the different components, which also makes it possible to improve accuracy. This characteristic also allows the distance I between the bearings to be reduced.

According to another characteristic of the invention, these aims are also achieved by using a housing covering the outer sides of the comparator's metallic casing. The housing makes it possible to solve the tightness problems. Furthermore, the housing makes it possible to increase the external diameter of the comparator and thus to use a display 4 that is larger and more legible, without having to increase the distance I between the bearings which is determined by the diameter of the metallic casing. The housing is preferably of synthetic material and can be held by the comparator's sockets, allowing for a simple construction. By disposing it so as to cover completely the metallic casing, it is furthermore possible to dispense with the expensive surface treatment of the casing, which allows the costs to be reduced without having to give up an attractive design.

DESCRIPTION OF THE DRAWINGS

The invention is to be read with reference to the description of an embodiment illustrated by the attached drawings containing the figures, in which.

DETAILED DESCRIPTION OF THE INVENTION

Figure 3:
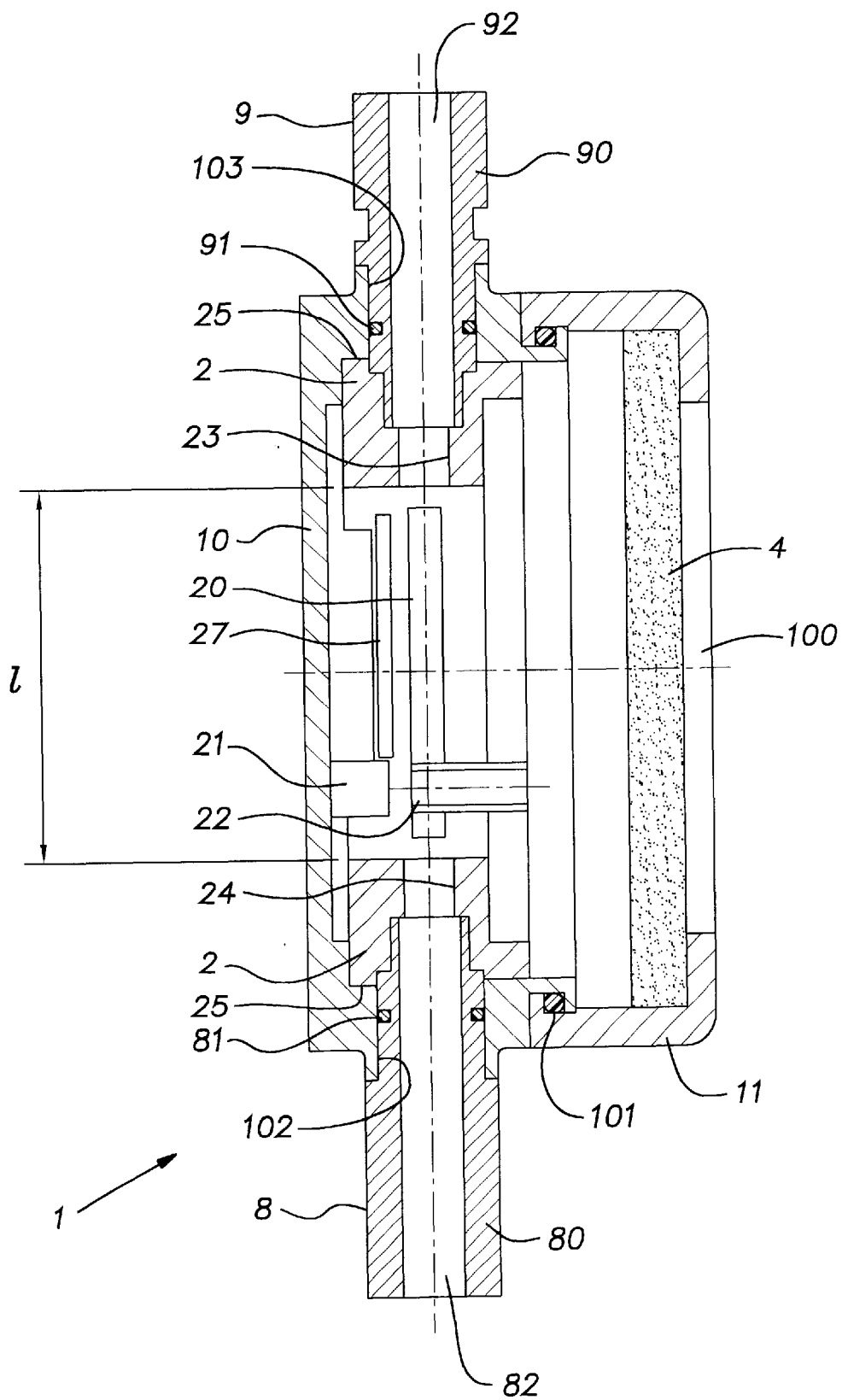
FIG. 3 shows a cross-section view of a comparator according to the invention.

FIG. 3 illustrates a cross-section view of a comparator according to the invention. In order to improve the figure's legibility, certain elements of the comparator, such as the probe (illustrated in FIG. 4) or the measuring system, have not been represented. The invention applies in fact to any type of measuring system for comparators, for example to purely mechanical systems with hand display, or to electronic systems, for example capacitive, inductive, optoelectronic or magnetoresistive, which enable the results to be displayed for instance on Liquid Crystal Displays 4 or to be exported via a serial interface, for example an optoelectronic interface RS232 (7).

The comparator 1 allows the position of the extremity 30 of the sensing probe 3 to be determined and compared with stored reference positions. It comprises a metallic casing 2 of a generally cylindrical shape fitted in this example with an upper bearing 23 and a lower bearing 24 enabling the probe 3 to slide longitudinally. The bearings are directly worked in the casing 2, in order to reduce the number of components and the sum of manufacture and assembly tolerances and thus to increase the accuracy whilst reducing the cost and the space requirement. This arrangement furthermore allows the distance I between the bearings 23 and 24 to be reduced, notably to be made well inferior to the external diameter of the comparator's housing, and thus to diminish the bending of the probe 3 in the measuring zone between the bearings, which improves accuracy.

According to the embodiment, different types of bearings 23, 24 can be used, notably jewel bearings and/or oil bearings which ensure optimum sliding. The invention also applies to comparators in which the probe goes through the casing only at one point and that are thus fitted with a single bearing. The invention pertains also to less advantageous variants of comparators fitted with two bearings, but of which only one is directly worked into the casing 2.

A lower socket 8 is firmly attached to the casing 2, for example by screwing, gluing, or driving in. This socket is optional and could be absent according to the realized embodiment. In an embodiment not illustrated, the upper socket 9 could also be made of synthetic material, for example integrated in a housing 10 or a cover 11 described further below. The lower socket 8 is provided with a through opening 82 for the probe 3 to pass, the diameter of the opening 82 being slightly greater than the inner diameter of the lower bearing 24. The lower socket 8 does not therefore participate to the guiding of the probe 3, so that the constraints for the manufacturing it and fixating it to the casing 2 are less critical. The socket 8 enables the comparator to be attached to the external devices, for example to machines or along an assembly line.

Similarly, in the example illustrated, an upper socket 9 is firmly attached to the casing 2, for example by screwing, gluing or driving in. This socket is optional and could be absent according to the realized embodiment. In an embodiment not illustrated, the upper socket 9 could also be made of synthetic material, for example integrated in the housing 10 or the cover 11 described further below. As for the lower socket 8, the upper socket 9 is provided with a through opening 92 of a diameter slightly greater than the inner diameter of the bearing 23 and thus does not participate to the guiding of the probe.

Figure 1:
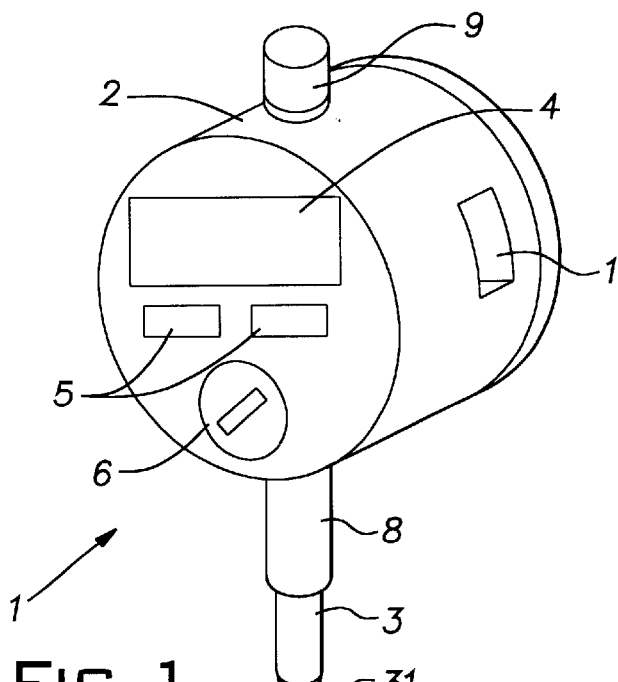
FIG. 1, which has already been described, shows a perspective view of a comparator that does not have the advantages of the invention.
Figure 2:
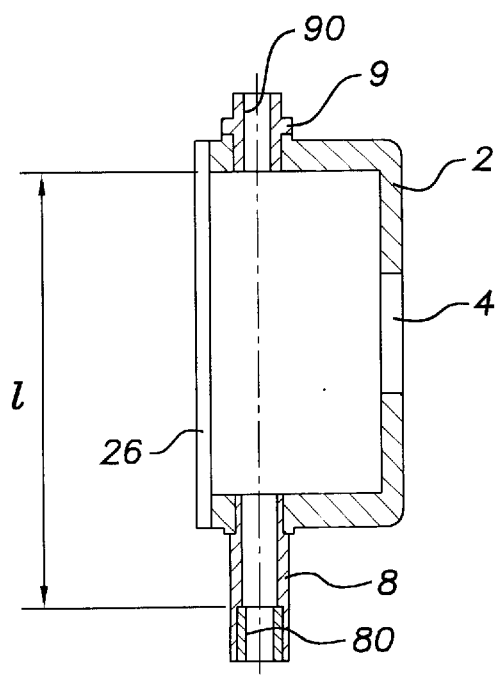
FIG. 2, which has already been described, shows a cross-section view of a comparator that does not have the advantages of the invention.
Figure 4:
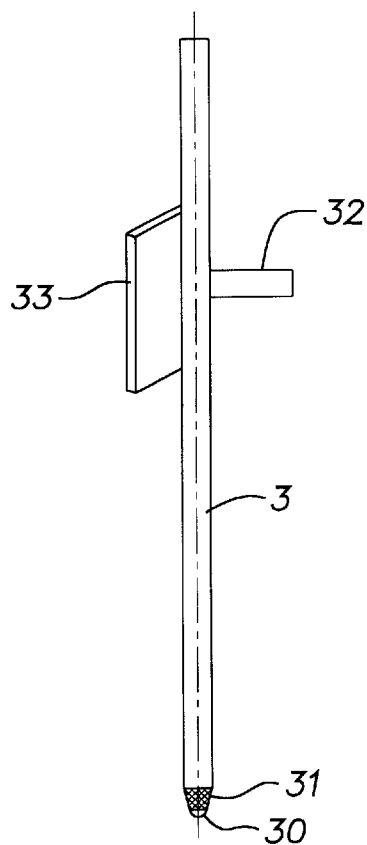
FIG. 4 shows a perspective view of a probe adapted to a comparator according to the invention.

The probe 3 is represented in perspective in FIG. 4. It comprises essentially a cylindrical body whose diameter is worked accurately, in order to avoid any lateral play in the bearings 23 and 24. The extremity of the probe 31 is fitted with a probe tip 30 whose shape and hardness can be adapted to the planned use; in a preferred embodiment, the probe tip 30 can be unscrewed by seizing it by a portion 31 to replace it by a more appropriate tip.

In the embodiment represented, a mobile portion 33 of a position determining electronic circuit is firmly attached to the probe 3, so as to work with a schematically shown fixed part 27 linked to the casing 2 of the measuring circuit. The relative position of the mobile portion 33 and of the fixed portion 27 can be determined and compared with a stored reference value and the result can be displayed on numerical display means 4. The magnetoresistive or optoelectronic type, the invention not being restricted to these examples and being applicable also to entirely mechanical comparators. In the case of a capacitive or magnetoresistive system, the fixed portion 27 will for example be constituted by a plane sensor mounted at close range opposite a sliding rule 33 fitted with capacitive respectively magnetic electrodes. In the case of an electro-optical system, the measuring system will comprise for example a light emitter sending, through one or several lenses, a light beam through a graded rule 33 as well as an optical captor reacting to the light transmitted or reflected by the rule.

The probe 3 is provided with a guiding portion 32 working with a guiding slit 20 worked or attached to the inner side of the casing, in order to prevent the probe from swiveling around its own axis. A stop 21, in which a screw 22 can be screwed from the front side of the comparator, allows to limit the longitudinal travel of the probe 3 and to prevent the rule 33 from coming into contact with the casing.

The casing 2 of the comparator is covered by a housing 10 of synthetic material or possibly of stamped plate, covering preferably all outer sides 25 of the casing and also closing the bottom. The housing 10 protects the comparator from shocks and liquid infiltrations and gives it an attractive design. In order to limit the number of components and the water infiltration points, one will use preferably a housing made of a single piece. According to the invention, the housing 10 is held on the casing 2 by the sockets 8 and 9 inserted in the openings 102, 103 through the housing 10. The comparator is thus assembled by placing the metallic casing 2 in the housing 10, then by inserting the socket or sockets 8 and 9 through the openings 102, 103 in order to attach them to the casing. A circular joint 81 is preferably provided to prevent liquid or vapor infiltrations between the lower socket 8 and the housing 10; similarly, a circular joint 91 can be placed between the upper socket 9 and the housing 10. Screws or elastically deformable elements, not represented, can be provided in an alternative embodiment at different places of the housing in order to prevent for example the bottom of the housing 10 from moving.

The comparator is furthermore fitted with a cover 11 mounted on the housing 10 and closing the front side. The cover 11 itself will preferably be made of synthetic material and provided with a display 4 visible through an optional glass plate 100 welded or glued tightly in an opening through the cover 11. The cover 11 will for example be screwed, glued, welded or preferably held by elastic deformation on the housing 10, a torc joint 101 being provided to prevent any infiltration of liquid or of vapor. A stop, not represented, is provided to prevent the cover from rotating in relation to the housing. In an embodiment, not represented, the cover 11 is on the contrary rotating in relation to the housing 10 in order to reestablish the horizontality of the display 4 even when the comparator is not installed vertically. In this case, the display 4 will preferably be attached to the electronic measuring system, not represented, by a mat of flexible cables, not represented. The operating of the comparator and the display 4 are controlled by function keys, not represented, on the cover and/or on the housing 10, which allow for instance to select the unit of measurement or to store reference positions. One will for example use function keys of a soft elastomer compressed in corresponding openings through the housing 10 and/or the cover 11 so as to ensure tightness.

In an alternative embodiment, not represented, the junction between the housing and the cover is oblique, so that the housing is held by the lower socket and the cover by the upper socket (or vice-versa).

The comparator furthermore comprises preferably a serial exit, not represented, for example a connector which enables an optoelectronic plug to be inserted. A battery compartment, for example for a lithium battery, will furthermore be provided for example in the lateral sides of the comparator, so as to allow the battery to be replaced by opening the compartment without it being necessary to disassemble the plastic housing 10 nor even to remove the cover 11. Appropriate joints will be provided for the battery compartment and possibly for the optoelectronic interface.

The comparator can be supplied with a cap, not represented, to be inserted over the upper socket 9 to prevent liquid infiltrations through this socket. A joint can be provided between the socket 9 and the cap. An extensible bellows, not represented, can also be provided over the lower socket 8 and the probe 3 to avoid liquid infiltrations through the opening 82.

The housing 10 and the different joints described above make it possible to obtain a comparator with a protection index according to norm DIN40050 for example equal to IP54, i.e. protected against dust (no detrimental deposits) and protected against sprayings of liquid from all directions. Other means can be conceived in the framework of this invention to improve even more the tightness of the internal volume of the comparator. For example, a valve allowing air to flow in but retaining vapors and dust can be used to balance the internal pressure and the external atmospheric pressure. A capsule of dessicating product can also be placed inside the comparator to absorb the liquids that might have entered for example as vapor.

The one skilled in the art will understand that comparators of very diverse types, shapes and dimensions can be produced in the framework of this invention, as well as other types of similar devices for measuring and comparing lengths, depths, angles, diameters, etc.

What is claimed is:

1. A comparator for measuring and comparing linear or angular dimensions, comprising:
    a metallic casing having outer sides, at least one bearing intended to accommodate a sensing probe going through said casing,
    a measuring system comprising a mobile portion driven by said sensor probe and a fixed portion firmly attached to the casing,
    a housing covering the outer sides of said casing and held by said at least one socket.

2. The comparator according to the preceding claim, in which said outer sides of the casing are entirely covered by said housing.

3. The comparator according to claim 1, in which a joint is provided between said housing and said at least one socket.

4. The comparator according the claim 1, fitted further with a cover attached to said housing, a joint being provided between said housing and said cover.

5. The comparator according to claim 4, said cover bearing a display and able to pivot in relation to said casing.

6. The comparator according to claim 1, comprising a lower socket and an upper socket both firmly attached to the casing, said housing being held by both sockets.

7. The comparator according to claim 1, in which said at least one bearing is worked or attached directly into the casing.

8. A comparator for measuring and comparing linear or angular dimensions, comprising:
    a metallic casing,
    at least one bearing intended to accommodate a sensing probe going through said casing,
    a measuring system comprising a mobile portion driven by said sensing probe and a fixed portion firmly attached to the casing,
    said at least one bearing being worked or attached directly into the casing,
    a lower bearing and an upper bearing both worked or attached directly into the casing,
    wherein the comparator is fitted with a housing, the distance between the lower bearing and the upper bearing being less then the inner diameter of said housing.

9. The comparator according to claim 8 in which said housing is of synthetic material, covers the outer sides of said casing and is held by said at least one socket.

* * * * *